US008929950B2

(12) United States Patent
Kobayashi et al.

(10) Patent No.: US 8,929,950 B2
(45) Date of Patent: Jan. 6, 2015

(54) WIRELESS COMMUNICATION SYSTEM, REMOTE ACCESS DEVICE, AND BASE STATION DEVICE

(75) Inventors: Takaharu Kobayashi, Kawasaki (JP); Tsuyoshi Shimomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 217 days.

(21) Appl. No.: 12/985,663

(22) Filed: Jan. 6, 2011

(65) Prior Publication Data
US 2011/0171944 A1 Jul. 14, 2011

(30) Foreign Application Priority Data

Jan. 14, 2010 (JP) ................................. 2010-005437

(51) Int. Cl.
| | |
|---|---|
| H04B 1/38 | (2006.01) |
| H04W 88/08 | (2009.01) |
| H04W 16/28 | (2009.01) |
| H04W 72/04 | (2009.01) |
| H04W 92/12 | (2009.01) |

(52) U.S. Cl.
CPC ............ *H04W 88/085* (2013.01); *H04W 16/28* (2013.01); *H04W 72/0433* (2013.01); *H04W 92/12* (2013.01)
USPC ............. 455/561; 455/9; 455/11.1; 455/13.1; 455/450; 455/509; 455/515; 455/562.1

(58) Field of Classification Search
USPC ............. 455/450, 451, 452.1, 452.2, 7, 11.1, 455/13.1, 16, 509, 9, 515, 561, 562.1; 370/315, 322, 328, 329, 330, 335, 431, 370/436, 441
See application file for complete search history.

(56) References Cited

U.S. PATENT DOCUMENTS

| | | | |
|---|---|---|---|
| 6,807,374 B1 | 10/2004 | Imajo et al. | |
| 7,429,936 B2* | 9/2008 | Paradiso et al. | 340/988 |
| 7,522,563 B2* | 4/2009 | Rhee | 370/338 |
| 7,720,020 B2* | 5/2010 | Larsson | 370/315 |

(Continued)

FOREIGN PATENT DOCUMENTS

| | | |
|---|---|---|
| JP | 09-051573 | 2/1997 |
| JP | 2000-324044 | 11/2000 |

(Continued)

OTHER PUBLICATIONS

European Patent Office, Extended European Search Report with Annex to the European Search Report issued for corresponding European Patent Application No. 11150614.3, dated Apr. 1, 2011.

*Primary Examiner* — Olumide T Ajibade Akonai
(74) *Attorney, Agent, or Firm* — Myers Wolin, LLC

(57) ABSTRACT

A wireless communication system includes a base station including a determining section that determines control information indicating signal processing for each of wireless resources used for wireless communication with terminal equipment units, and remote access sections each including a first signal processing section that performs first signal processing on a first downlink signal received from the base station so as to generate a second downlink signal to be transmitted to the units via the wireless communication, and a second signal processing section that performs second signal processing on a second uplink signal received from the units via the wireless communication so as to generate a first uplink signal to be transmitted to the base station, and at least one of the first signal processing and the second signal processing being performed for each of the wireless resources based on the control information.

11 Claims, 21 Drawing Sheets

(56) References Cited

U.S. PATENT DOCUMENTS

| | | | |
|---|---|---|---|
| 8,018,893 B2 * | 9/2011 | Sartori et al. | 370/329 |
| 8,040,826 B2 * | 10/2011 | Lee et al. | 370/293 |
| 8,228,841 B2 * | 7/2012 | Jung et al. | 370/328 |
| 2002/0103001 A1 | 8/2002 | Weissman | |
| 2005/0088992 A1 | 4/2005 | Bolin et al. | |
| 2008/0080436 A1 * | 4/2008 | Sandhu et al. | 370/338 |
| 2009/0097433 A1 * | 4/2009 | Shen et al. | 370/315 |
| 2010/0110968 A1 * | 5/2010 | Lee et al. | 370/315 |
| 2011/0164536 A1 * | 7/2011 | Lin et al. | 370/259 |

FOREIGN PATENT DOCUMENTS

| | | |
|---|---|---|
| JP | 2007-053768 | 3/2007 |
| WO | 98/24256 | 6/1998 |
| WO | 2005/039214 | 4/2005 |

* cited by examiner

FIG. 3

| UE NUMBER | RAU NUMBER OF RAU WITH THE FIRST LEVEL OF SUITABILITY | ... | RAU NUMBER OF RAU WITH THE K-TH LEVEL OF SUITABILITY |
|---|---|---|---|
| #1 | 2 | ... | 6 |
| #2 | 5 | ... | 1 |
| #3 | 4 | ... | 2 |
| : | : | | : |

FIG. 4

| WIRELESS RESOURCE NUMBER | NUMBER OF ASSIGNED UE |
|---|---|
| r1 | #x |
| r2 | #x |
| r3 | #y |
| : | : |

FIG. 5

| RAU NUMBER | TRANSMISSION WITH WIRELESS RESOURCE | | |
|---|---|---|---|
| | r1 | r2 | ... |
| 1 | YES | NO | ... |
| 2 | NO | YES | ... |
| 3 | NO | NO | ... |
| ⋮ | ⋮ | ⋮ | |

FIG. 10

| WIRELESS RESOURCE NUMBER | PRECODING VECTOR |
|---|---|
| 1 | $\begin{bmatrix} 1 \\ 0 \end{bmatrix}$ |
| 2 | $\begin{bmatrix} 0 \\ 1 \end{bmatrix}$ |
| 3 | $\frac{1}{\sqrt{2}}\begin{bmatrix} 1 \\ 1 \end{bmatrix}$ |
| 4 | $\frac{1}{\sqrt{2}}\begin{bmatrix} 1 \\ -1 \end{bmatrix}$ |
| 5 | $\frac{1}{\sqrt{2}}\begin{bmatrix} 1 \\ j \end{bmatrix}$ |
| 6 | $\frac{1}{\sqrt{2}}\begin{bmatrix} 1 \\ -j \end{bmatrix}$ |

FIG. 11

| WIRELESS RESOURCE NUMBER | PRECODING VECTOR NUMBER |
|---|---|
| r1 | 3 |
| r2 | 5 |
| r3 | 2 |
| : | : |

FIG. 12

| RAU NUMBER | PRECODING VECTOR NUMBER FOR TRANSMISSION OF STREAM 1 WITH WIRELESS RESOURCE | | |
|---|---|---|---|
| | r1 | r2 | ... |
| 1 | 1 | 7 | ... |
| 2 | 7 | 6 | ... |
| 3 | 7 | 7 | ... |
| ⋮ | ⋮ | ⋮ | |

FIG. 14

| WIRELESS RESOURCE NUMBER | UE NUMBER ASSIGNED TO STREAM 1 | ... | UE NUMBER ASSIGNED TO STREAM N |
|---|---|---|---|
| r1 | #x | ... | #y |
| r2 | #x | ... | #z |
| r3 | #u | ... | #v |
|  |  |  |  |

PUNCTURE PATTERN P1

PUNCTURE PATTERN P2

WIRELESS COMMUNICATION SYSTEM, REMOTE ACCESS DEVICE, AND BASE STATION DEVICE

CROSS-REFERENCE TO RELATED APPLICATION

This application is based upon and claims the benefit of priority of the prior Japanese Patent Application No. 2010-005437, filed on Jan. 14, 2010, the entire contents of which are incorporated herein by reference.

FIELD

Embodiments discussed herein relate to a wireless communication system in which a base station and remote access units communicate with each other and the remote access units and terminal equipment units wirelessly communicate with each other.

BACKGROUND

With an increase in a data rate in a mobile communication system, the radio frequency tends to be increased and the size of cells tends to be reduced. In addition, the size of cells is limited in some cases due to geographical constraints or building constraints.

A distributed antenna system, for example, has been proposed for such cases. The distributed antenna system includes remote access units as wireless processing sections each having an antenna and part of the base station functions. The remote access units are typically individually arranged in small cells. The small cells each arranged with the remote access units are regarded as one large cell in the distributed antenna system. The remote access units wirelessly communicate with terminal equipment (user equipment). In the distributed antenna system, a single base station may be used for various areas, and the number of times of handover may be reduced. Thus, the distributed antenna system may provide improved cost performance.

As a link topology (physical topology), a bus topology, a star topology or a hybrid topology that includes a bus topology and a star topology, is used.

As related techniques, the following techniques are known: a technique using various connection topologies; a technique using a loop topology; and a technique in which a base station transmits different multiple downlink signals so that multiple remote access units receive the signals, respectively.

SUMMARY

According to an aspect of the embodiments discussed herein, a wireless communication system includes a base station including a determining section that determines control information indicating signal processing for each of a plurality of wireless resources used for wireless communication with a plurality of terminal equipment units, and includes a plurality of remote access sections each including a first signal processing section that performs first signal processing on a first downlink signal received from the base station so as to generate a second downlink signal to be transmitted to the plurality of terminal equipment units via wireless communication, and a second signal processing section that performs second signal processing on a second uplink signal received from the plurality of terminal equipment units via the wireless communication so as to generate a first uplink signal to be transmitted to the base station, and at least one of the first signal processing and the second signal processing being performed for each of the wireless resources based on the control information.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 3 is a diagram illustrating an association table;

FIG. 4 is a diagram illustrating a wireless resource assignment table;

FIG. 5 is a diagram illustrating a wireless resource transmission table;

FIG. 10 is a table illustrating an example of precoding vectors that are used when the number of transmission antennas is two;

FIG. 11 is a diagram illustrating a user equipment precoding vector table that is used when the wireless resource transmission table indicates that transmission needs to be performed;

FIG. 12 is a diagram illustrating a user equipment precoding vector table.

FIG. 14 is a diagram illustrating a wireless resource assignment table that is used when the multiple transmission streams are used;

DESCRIPTION OF EMBODIMENTS (First Embodiment)

A distributed antenna system 1 that is an example of the wireless communication system disclosed herein is described below.

Figure 1:
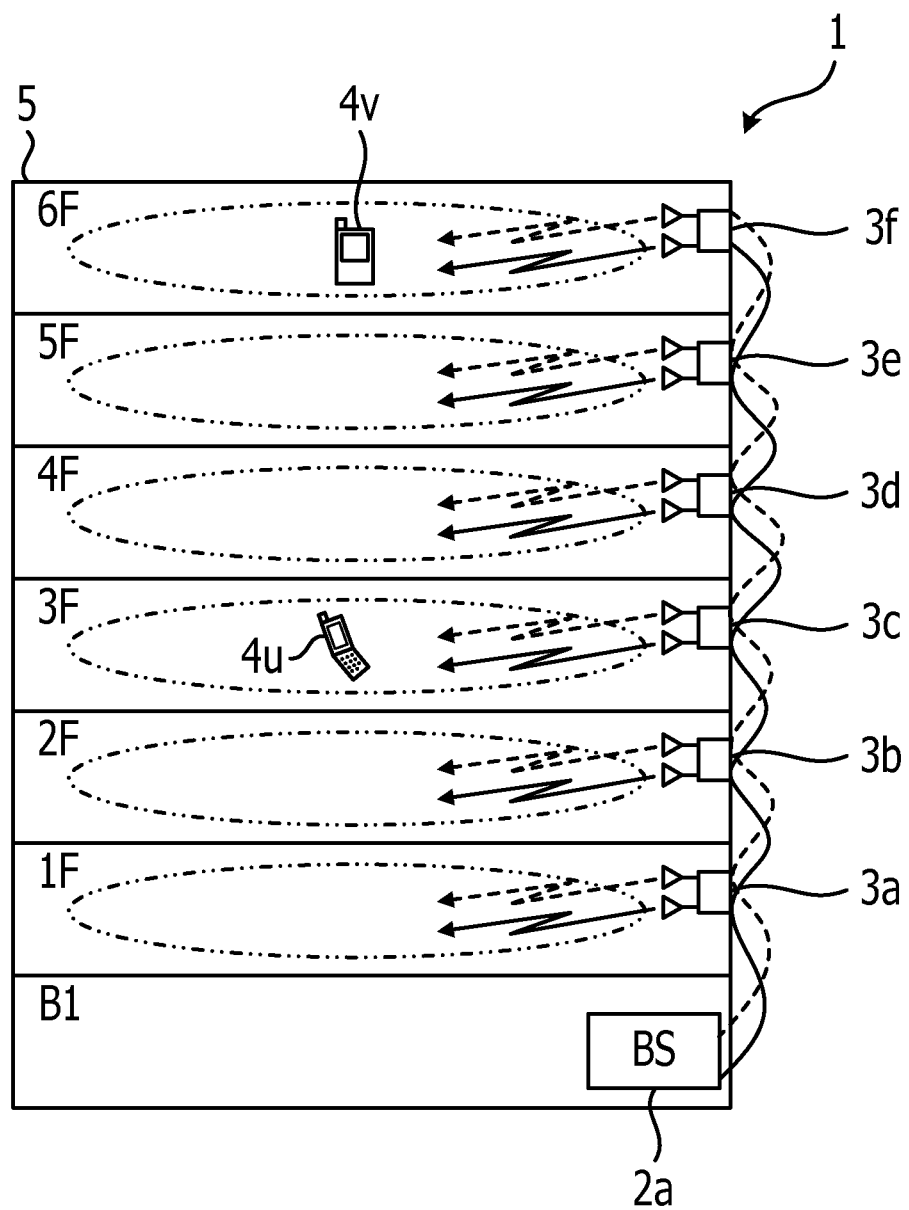
FIG. 1 is a block diagram illustrating the configuration of a distributed antenna system.

FIG. 1 is a block diagram illustrating the configuration of the distributed antenna system 1. The distributed antenna system 1 includes a base station (BS) 2a, remote access units (RAUs) 3a, 3b, 3c, 3d, 3e and 3f, and user equipment units (UE) 4u and 4v. The distributed antenna system 1 is installed in a building 5. The building 5 has six floors and one basement floor. The base station 2a is located on the basement floor. The remote access units 3a, 3b, 3c, 3d, 3e and 3f are located on the first, second, third, fourth, fifth and sixth floors, respectively. The user equipment 4u and 4v may be moved, for example as users move between floors. In this example, user equipment 4u is located on the third floor while user equipment 4v is located on the sixth floor.

In this example, the base station 2a and each of the remote access units 3a, 3b, 3c, 3d, 3e and 3f communicate with each other via an interface (hereinafter referred to as a BS-to-RAU interface) between the base station and the remote access units. The BS-to-RAU interface is, for example, a metal cable, an optical fiber cable or the like, or is wireless. A link topology (physical topology) in which the base station 2a and the remote access units 3a, 3b, 3c, 3d, 3e and 3f are coupled to each other is, for example, of a bus type, a star type or a hybrid type that includes a bus topology and a star topology.

The remote access units 3a, 3b, 3c, 3d, 3e and 3f and the user equipment 4u and 4v wirelessly communicate with each other.

Next, the configuration of the base station 2a is described.

Figure 2:
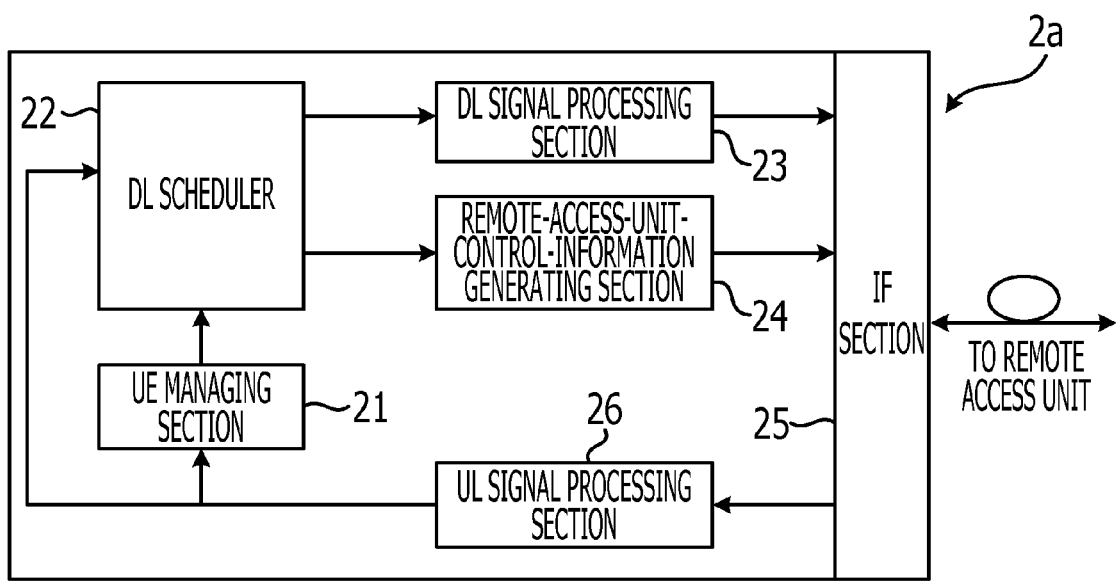
FIG. 2 is a block diagram illustrating the configuration of a base station.

FIG. 2 is a block diagram illustrating the configuration of the base station 2a. The base station 2a includes an UE managing section 21, a downlink (DL) scheduler 22, a DL signal processing section 23, a remote-access-unit-control-information generating section 24, an interface (IF) section 25 and an uplink (UL) signal processing section 26.

Next, a base station downlink process that is performed on a downlink signal by the base station 2a is described.

The UE managing section 21 performs an association process so that the user equipment 4u and 4v are associated with the remote access units 3a, 3b, 3c, 3d, 3e and 3f. Then, the UE managing section 21 causes an association table to be stored in a memory that is included in the base station 2a (memory not shown). The association table indicates the results of the association process. FIG. 3 is a diagram illustrating the association table. The association table indicates, for each user equipment, a user equipment (UE) number and remote access unit (RAU) numbers of the remote access units associated with the user equipment. In this example, priority levels that indicate levels of suitability for communication with the user equipment are added to the associated RAU numbers. Specifically, the association table indicates, for each user equipment unit, a RAU number of a remote access unit that has the first level (first priority level) of suitability for communication with the user equipment unit through a RAU number of a remote access unit that has the k-th level (k-th priority level) of suitability for communication with the user equipment unit. In this example, the number K of remote access units is 6.

In the association process, the UE managing section 21 determines the associated RAU numbers by acquiring information on communication qualities (such as error rates and reception power) obtained when signals transmitted by the user equipment 4u and 4v are received by the remote access units 3a, 3b, 3c, 3d, 3e and 3f. The associated RAU numbers may be RAU numbers of the remote access units to which priority levels are added based on the communication qualities. In addition, the associated RAU numbers may be RAU numbers of the remote access units that satisfy a predetermined communication quality requirement.

The DL scheduler 22 assigns wireless resources to the user equipment 4u and 4v using a predetermined wireless resource assignment method. Then, the DL scheduler 22 causes a wireless resource assignment table to be stored in the memory included in the base station 2a. The wireless resource assignment table indicates the results of the assignment.

For example, when the distributed antenna system 1 uses orthogonal frequency division multiple access (OFDMA), the wireless resources are frequency blocks that are groups of multiple subcarriers. When the distributed antenna system 1 uses code division multiple access (CDMA), the wireless resources are spreading codes. When the distributed antenna system 1 uses frequency division multiple access (FDMA), the wireless resources are frequency bands. When the distributed antenna system 1 uses time division multiple access (TDMA), the wireless resources are time slots. In the following example, the distributed antenna system 1 uses OFDMA.

In the wireless resource assignment method, various algorithms such as round robin (RR) and proportional fairness (PF) may be used. For example, the DL scheduler 22 estimates an instantaneous throughput obtained when a certain wireless resource is used. Then, the DL scheduler 22 assigns, to the certain wireless resource, a user equipment unit for which the ratio of the estimated instantaneous throughput to the average throughput has been calculated and is largest.

FIG. 4 is a diagram illustrating the wireless resource assignment table. The wireless resource assignment table indicates, for each of the wireless resources, a wireless resource number and a user equipment number of the user equipment unit assigned to the wireless resource.

The wireless resource assignment table may be set in the memory included in the base station 2a.

In addition, the DL scheduler 22 generates a wireless resource transmission table based on the wireless resource assignment table and the association table. FIG. 5 is a diagram illustrating the wireless resource transmission table. The wireless resource transmission table indicates, for each of the remote access units, a RAU number and transmission wireless resources that are wireless resources that may be used for transmission to be performed by the remote access unit. The transmission wireless resources are each indicated by "Yes" or "No" for each of wireless resource numbers. In this case, the word "Yes" indicates that the remote access unit needs to perform transmission with the wireless resource, while the word "No" indicates that the remote access unit does not need to perform transmission with the wireless resource.

The word "Yes" may indicate that the remote access unit needs to perform reception or may indicate that the remote access unit needs to perform transmission and reception. The word "No" may indicate that the remote access unit does not need to perform reception or may indicate that the remote access unit does not need to perform transmission and reception.

The DL signal processing section 23 selects, based on the wireless resource assignment table in the order of the wireless resource numbers, data that is to be transmitted to the user equipment assigned to the wireless resources. Then, the DL signal processing section 23 generates, based on the selected data, a base station downlink signal that includes information on a downlink from the base station to the remote access units.

The remote-access-unit-control-information generating section 24 generates remote access unit control information that includes the association table, the wireless resource assignment table and the wireless resource transmission table.

The IF section 25 transmits the base station downlink signal and the remote access unit control information to the remote access units 3a, 3b, 3c, 3d, 3e and 3f through the BS-to-RAU interface.

Next, the configuration of the remote access units 3a, 3b, 3c, 3d, 3e and 3f is described.

Figure 6:
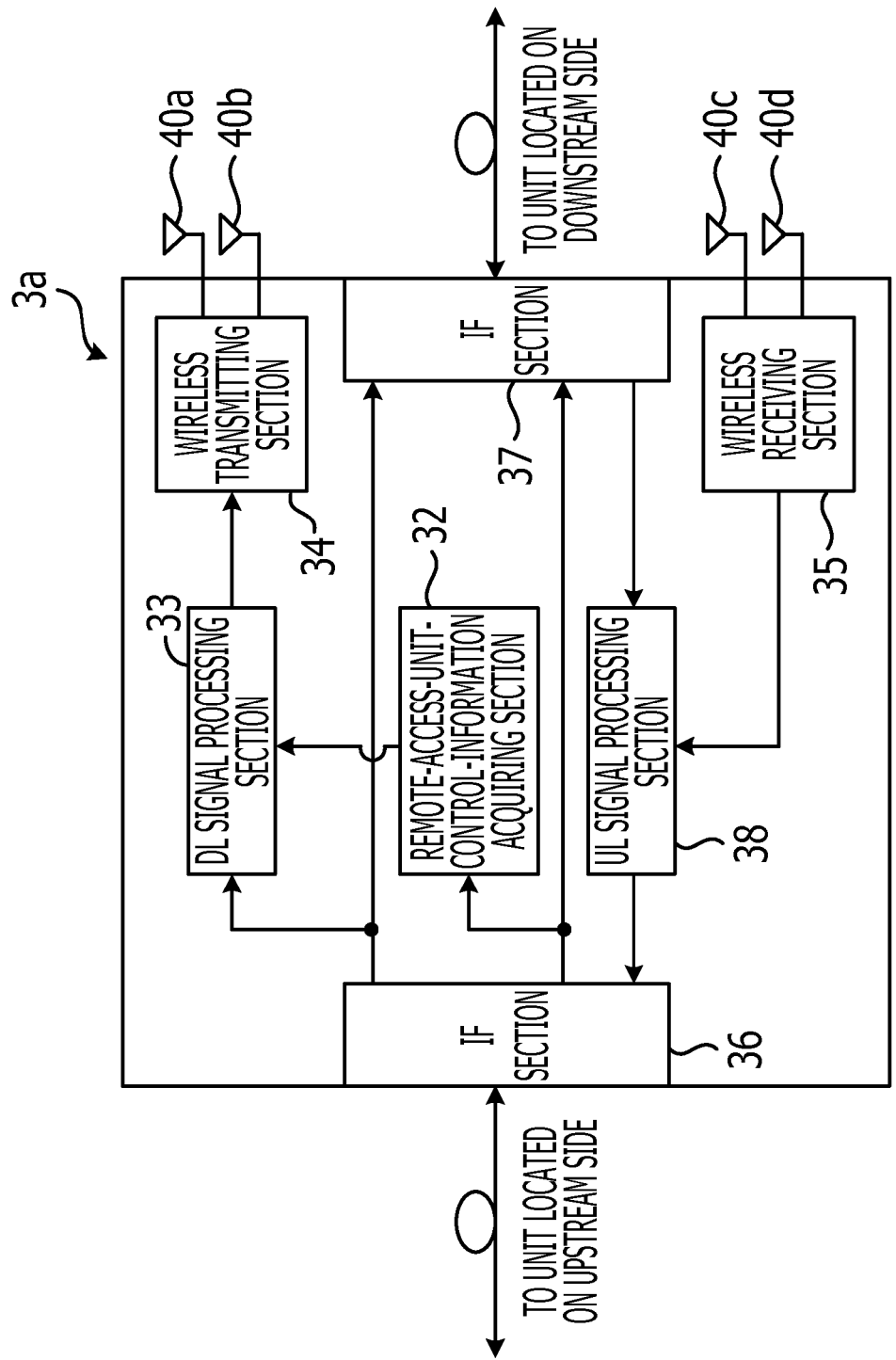
FIG. 6 is a block diagram illustrating the configuration of a remote access unit.

FIG. 6 is a block diagram illustrating the configuration of the remote access unit 3a. The remote access unit 3a includes a remote-access-unit-control-information acquiring section 32, a DL signal processing section 33, a wireless transmitting section 34, a wireless receiving section 35, interface (IF) sections 36 and 37, an UL signal processing section 38 and antennas 40a, 40b, 40c and 40d. The configuration of each of the remote access units 3b, 3c, 3d, 3e and 3f is substantially the same as the configuration of the remote access unit 3a. In the present embodiment, the remote access units 3a, 3b, 3c, 3d, 3e and 3f may be coupled in cascade to each other by wires.

The remote access units 3a, 3b, 3c, 3d, 3e and 3f each have a memory therein (not shown). The remote access unit numbers are assigned to the remote access units 3a, 3b, 3c, 3d, 3e and 3f, respectively, and may be stored in the memories of the remote access units 3a, 3b, 3c, 3d, 3e and 3f, respectively.

In this example, the IF section 36 of a remote access unit that is one of the remote access units 3a, 3b, 3c, 3d, 3e and 3f and located on the farthest upstream side in the cascade connection is coupled to the base station 2a by wires.

Next, a remote access unit downlink process that is performed on a downlink signal by each of the remote access units 3a, 3b, 3c, 3d, 3e and 3f is described.

The IF section 36 receives the base station downlink signal and the remote access unit control information from the base station 2a or a unit that is located on the upstream side of the remote access unit and is another remote access unit among the remote access units 3a, 3b, 3c, 3d, 3e and 3f.

The IF section 37 transmits the base station downlink signal to a unit that is located on the downstream side of the remote access unit and is another remote access unit among the remote access units 3a, 3b, 3c, 3d, 3e and 3f.

The remote-access-unit-control-information acquiring section 32 extracts, from the received remote access unit control information, remote access unit control information that corresponds to a remote access unit number of the remote access unit.

Figure 7:
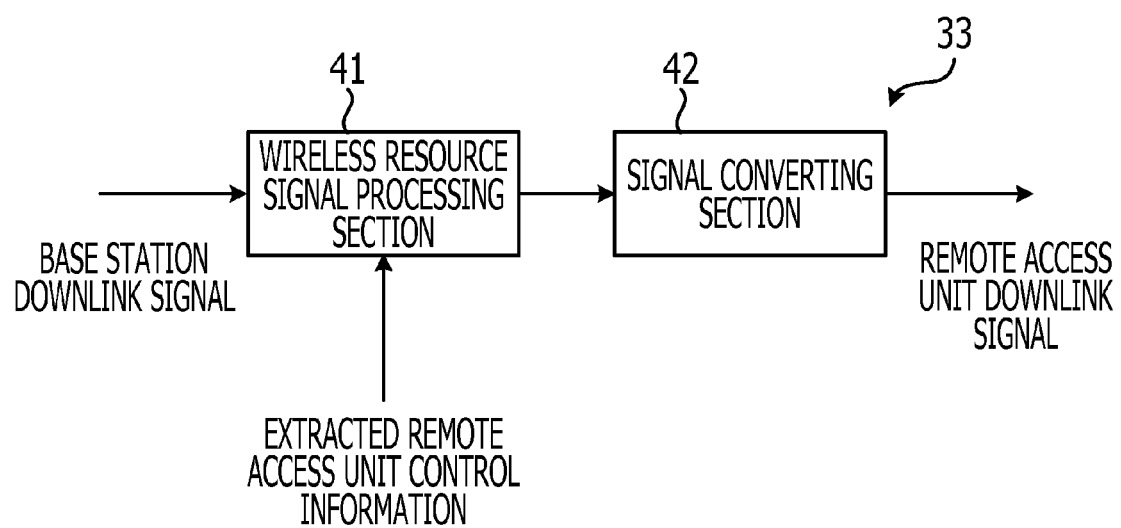
FIG. 7 is a block diagram illustrating the configuration of a DL signal processing section that is included in the remote access unit.

FIG. 7 is a block diagram illustrating the configuration of the DL signal processing section 33 that is included in the remote access unit 3a. The DL signal processing section 33 includes a wireless resource signal processing section 41 and a signal converting section 42. The wireless resource signal processing section 41 extracts based on the extracted remote access unit control information, from the received base station downlink signal, information on a wireless resource that is necessary for transmission to be performed by the remote access unit. In other words, the wireless resource signal processing section 41 removes information on wireless resources that are not necessary for the transmission that is performed by the remote access unit. When the remote access unit 3a performs multiple-input multiple-output (MIMO) transmission, the wireless resource signal processing section 41 performs precoding on the extracted information on the wireless resource using a precoding vector that is provided for the wireless resource. Precoding vectors are provided for the wireless resources, respectively.

The signal converting section 42 performs inverse fast Fourier transform (IFFT) on the extracted information on the wireless resource so as to generate a remote access unit downlink signal that includes information on a downlink from the remote access unit to the user equipment.

The remote access unit downlink signal includes the association table, the wireless resource assignment table and the wireless resource transmission table.

The wireless transmitting section 34 performs modulation processing (such as upconversion) on the remote access unit downlink signal output from the DL signal processing section 33. The wireless transmitting section 34 wirelessly transmits a signal generated by the modulation processing to the user equipment 4u and 4v through the antennas 40a and 40b.

Figure 8:
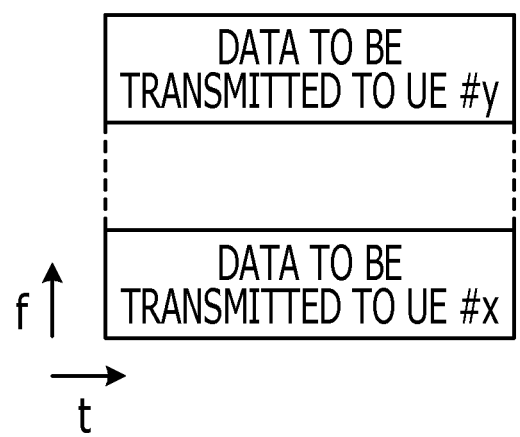
FIG. 8 is a schematic diagram illustrating the configuration of a signal that is transmitted by the remote access unit.

FIG. 8 is a schematic diagram illustrating the configuration of the signal transmitted from the remote access unit 3a. In FIG. 8, the abscissa indicates time, while the ordinate indicates a frequency. The signal illustrated in FIG. 8 is transmitted only via the wireless resource that is indicated by the extracted remote access unit control information to be necessary[???].

In the remote access unit downlink process, each of the remote access units does not transmit the signal to a user equipment that is not associated with the remote access unit based on the association table. For example, a remote access unit only transmits a signal to a user equipment associated with the remote access unit based on the association table.

The user equipment 4u and 4v each generates, based on the wireless resource assignment table, a user equipment uplink signal that includes information on an uplink from the user equipment to the remote access units 3a, 3b, 3c, 3d, 3e and 3f. Then, the user equipment 4u and 4v each transmits the generated user equipment uplink signal to the remote access units 3a, 3b, 3c, 3d, 3e and 3f.

The wireless resource transmission table may indicate a coefficient for each of the wireless resources. In this case, the wireless resource signal processing section 41 multiplies, based on the extracted remote access unit control information, the received base station downlink signal by the coefficient provided for each of the wireless resources.

Next, a remote access unit uplink process that is performed on a uplink signal by each of the remote access units 3a, 3b, 3c, 3d, 3e and 3f is described.

The IF section 37 receives, from a unit that is located on the downstream side of the remote access unit and is another remote access unit among the remote access units 3a, 3b, 3c, 3d, 3e and 3f, a remote access unit uplink signal that includes information on an uplink from the remote access unit to the base station.

The wireless receiving section 35 receives wireless signals from the user equipment 4u and 4v through the antennas 40c and 40d and performs demodulation processing such as downconversion so as to generate a signal. The wireless receiving section 35 outputs the generated signal to the UL signal processing section 38.

Figure 9:
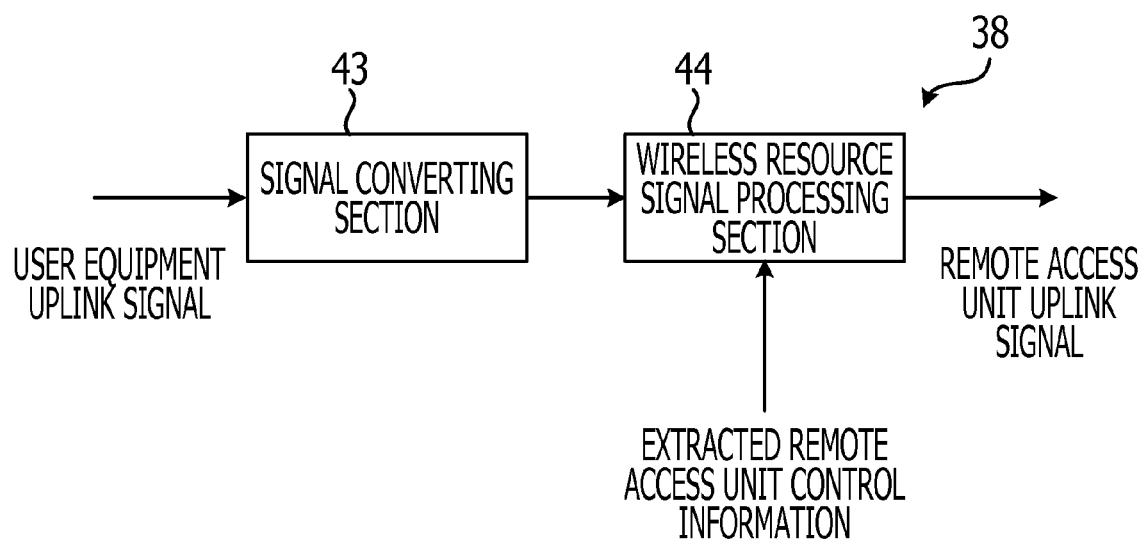
FIG. 9 is a block diagram illustrating the configuration of an UL signal processing section that is included in the remote access unit.

FIG. 9 is a block diagram illustrating the configuration of the UL signal processing section 38 that is included in the remote access unit 3a. The UL signal processing section 38 includes a signal converting section 43 and a wireless resource signal processing section 44. The signal converting section 43 receives the user equipment uplink signals through the antennas 40c and 40d and performs fast Fourier transform (FFT) on the received user equipment uplink signals. The wireless resource signal processing section 44 extracts, from the results of the FFT based on the extracted remote access unit control information, information on a wireless resource that is necessary for reception to be performed by the remote access unit 3a. In other words, the wireless resource signal processing section 44 removes information on wireless resources that are not necessary for reception that is performed by the remote access unit 3a. Then, the wireless resource signal processing section 44 combines the extracted information on the wireless resource with the remote access unit uplink signal that has been transmitted from another remote access unit among the remote access units 3a, 3b, 3c, 3d, 3e and 3f and received by the IF section 37. Then, the wireless resource signal processing section 44 generates a remote access unit uplink signal for the remote access unit.

Then, the IF section 36 transmits the remote access unit uplink signal to a remote access unit that is located on the upstream side of the remote access unit and is another remote access unit among the remote access units 3a, 3b, 3c, 3d, 3e and 3f.

In the present embodiment, the DL signal processing section 33 and the UL signal processing section 38 may each perform, for each of the wireless resources, signal processing to extract necessary information based on the extracted remote access unit control information. Either the DL signal processing section 33 or the UL signal processing section 38 may perform the signal processing to extract necessary information based on the extracted remote access unit control information.

Next, a base station uplink process that is performed on an uplink signal by the base station 2a is described.

The IF section 25 receives the remote access unit uplink signals from the remote access units 3a, 3b, 3c, 3d, 3e and 3f through the BS-to-RAU interface.

The UL signal processing section 26 demodulates information that is included in the remote access unit uplink signals and has been transmitted from the remote access units 3a, 3b, 3c, 3d, 3e and 3f.

The UE managing section 21 performs the aforementioned association process based on the information transmitted from each of the remote access units.

Next, the precoding that is performed in the remote access unit downlink process is described in detail.

A throughput may be improved by the precoding performed in the remote access unit downlink process. The precoding vector provided for each of the wireless resources and a precoding vector provided for each user equipment are calculated based on feedback transmitted from the user equipment or of the user equipment uplink signals.

FIG. 10 is a table illustrating an example of precoding vectors that are used when the number of transmission antennas is two. The UE managing section 21 causes a user equipment precoding vector table to be stored in the memory included in the base station 2a. The user equipment precoding table indicates a wireless resource number and a precoding vector number for each unit of user equipment.

The DL scheduler 22 generates the wireless resource assignment table and the user equipment precoding vector table. The DL scheduler 22 may separately generate the wireless resource transmission table and the precoding vector table that is used when the wireless resource transmission table indicates that transmission needs to be performed. FIG. 11 is a diagram illustrating the user equipment precoding vector table that is used when the wireless resource transmission table indicates that transmission needs to be performed. In this case, the user equipment precoding vector table indicates a precoding vector number for each of the wireless resource numbers of wireless resources that are used for a single remote access unit.

Information that is included in the wireless resource transmission table may be included in the user equipment precoding vector table. In this case, for example, a precoding vector number of a precoding vector corresponding to a wireless resource indicated by the wireless resource transmission table to be unnecessary for transmission is set to 7, and the precoding vector is set to a zero vector in the user equipment precoding vector table (illustrated in FIG. 11).

FIG. 12 is a diagram illustrating the user equipment precoding vector table. In this case, the user equipment precoding vector table indicates precoding vector numbers for each of the remote access unit numbers and precoding vector numbers for each of the wireless resource numbers. The remote access unit control information that is transmitted from the base station 2a to the remote access units 3a, 3b, 3c, 3d, 3e and 3f includes the user equipment precoding vector table instead of the wireless resource transmission table.

The remote access units 3a, 3b, 3c, 3d, 3e and 3f may use transmission antenna diversity in the remote access unit downlink process instead of the MIMO transmission. The remote access units 3a, 3b, 3c, 3d, 3e and 3f may use the MIMO transmission or transmission antenna diversity in the remote access unit uplink process.

Here, when all the remote access units transmit the same downlink signal, interference may occur frequently. On the other hand, when the base station transmits different downlink signals so that the remote access units receive the signals, respectively, it is necessary that the base station and the remote access units be coupled to each other in a star topology.

That is, when a base station transmits different downlink signals to remote access units through different links, and the remote access units transmit, through different links to the base station, uplink signals that have been transmitted from units of user equipment, the base station and the remote access units is coupled to each other in a star link topology for the uplinks and the downlinks. This may increase costs.

In the present embodiment, on the other hand, the base station 2a transmits the same downlink signal to the remote access units 3a, 3b, 3c, 3d, 3e and 3f that are located in the same cell. Regardless of a topology in which the base station 2a and the remote access units 3a, 3b, 3c, 3d, 3e and 3f are coupled to each other, links between the base station 2a and the remote access units 3a, 3b, 3c, 3d, 3e and 3f may be efficiently built.

The base station 2a associates the remote access units 3a, 3b, 3c, 3d, 3e and 3f with the user equipment 4u and 4v and transmits signals only to the user equipment 4u and 4v associated with the remote access units 3a, 3b, 3c, 3d, 3e and 3f. Thus, it may be possible to reduce the occurrence of unnecessary interference and increase the capacity of the system.

For example, in the building 5, the user equipment 4v that is located on the sixth floor is associated with the remote access unit 3f located in the same cell, and the user equipment 4u that is located on the third floor is associated with the remote access unit 3c located in the same cell. In this case, the remote access unit 3f may transmit a downlink signal only to the user equipment 4v, while the remote access unit 3c may transmit a downlink signal only to the user equipment 4u. Thus, it may be possible to suppress unnecessary transmission and reduce the occurrence of interference with a signal transmitted from another cell.

Next, a multiple-user MIMO scheme is described.

In the following description, the number of user equipment units that simultaneously transmit signals is two and the number of antennas of each of the remote access units 3a, 3b, 3c, 3d, 3e and 3f is two. The wireless transmitting sections 34 each perform precoding, using precoding vectors (a1 a2)$^t$ and (b1 b2)$^t$, on remote access unit downlink signals du and dv that are to be transmitted to the user equipment 4u and 4v, respectively. In this case, signals x1 and x2 that are transmitted from the antennas 40a and 40b of each of the wireless transmitting sections 34 are expressed by the following Equation.

$$\begin{pmatrix} x1 \\ x2 \end{pmatrix} = d^u \begin{pmatrix} a1 \\ a2 \end{pmatrix} + d^v \begin{pmatrix} b1 \\ b2 \end{pmatrix} \quad (1)$$

The antenna 40a of each of the remote access units 3a, 3b, 3c, 3d, 3e and 3f transmits the signal x1, while the antenna 40b of each of the remote access units 3a, 3b, 3c, 3d, 3e and 3f transmits the signal x2. Thus, the wireless signal that is directed to the user equipment 4u and the wireless signal that is directed to the user equipment 4v interfere with each other. Precoding vectors that are used for signals to be transmitted to different user equipment units are selected from among candidate vectors that are perpendicular to each other in order to reduce mutual interference. For example, the candidate vectors are vectors described in the following expressions.

$$\left\{ \begin{bmatrix} 1 \\ 0 \end{bmatrix}, \begin{bmatrix} 0 \\ 1 \end{bmatrix} \right\}, \left\{ \frac{1}{\sqrt{2}} \begin{bmatrix} 1 \\ j \end{bmatrix}, \frac{1}{\sqrt{2}} \begin{bmatrix} 1 \\ -j \end{bmatrix} \right\}, \left\{ \frac{1}{\sqrt{2}} \begin{bmatrix} 1 \\ 1 \end{bmatrix}, \frac{1}{\sqrt{2}} \begin{bmatrix} 1 \\ -1 \end{bmatrix} \right\} \quad (2)$$

In the downlink, if all the remote access units transmit the same downlink signal and vectors of the signals to be transmitted to multiple user equipment units are perpendicular to each other, the signals transmitted to the multiple user equipment units may interfere with each other due to different propagation paths. In this case, a signal that is received by a user equipment from a remote access unit located far from the user equipment does not contribute to a desired increase in reception power.

In the uplink, if uplink signals that are received by all the remote access units are combined and a signal obtained by combining the uplink signals is received by the base station, a similar problem may occur. In this case, the signals that are received by the remote access units include noise. A signal that is received by a remote access unit that is located far from a desired user equipment does not increase reception power of the signal transmitted from the desired user equipment and increases noise power.

In the remote access unit downlink process, on the other hand, the remote access unit 3a removes a portion (of the base station downlink signal) determined by the base station 2a as not necessary to be transmitted by the remote access unit 3a, and transmits the base station downlink signal without the removed portion. It is, therefore, possible to reduce the occurrence of interference of downlink signals that are to be received by the user equipment 4u and 4v.

In the remote access unit uplink process, the remote access unit 3a removes portions (of the user equipment uplink signals) determined by the base station 2a as not necessary to be received by the remote access unit 3a and receives the user equipment uplink signals without the removed portions. It is, therefore, possible to improve the signal-to-noise power ratio of a signal received by the base station 2a.

The base station 2a and the remote access units 3a, 3b, 3c, 3d, 3e and 3f and sections thereof may be each achieved by a circuit, a computer, digital signal processor or the like.

(Second Embodiment)

The case where the number of transmission streams is two or more in the aforementioned remote access unit downlink process is described below.

In the base station 2a, the DL scheduler 22 generates the association table, the wireless resource assignment table and the wireless resource transmission table for each of the transmission streams. Even when multiple transmission streams are used, the algorithms that may be used in the aforementioned wireless resource assignment method may also be used.

Figure 13:
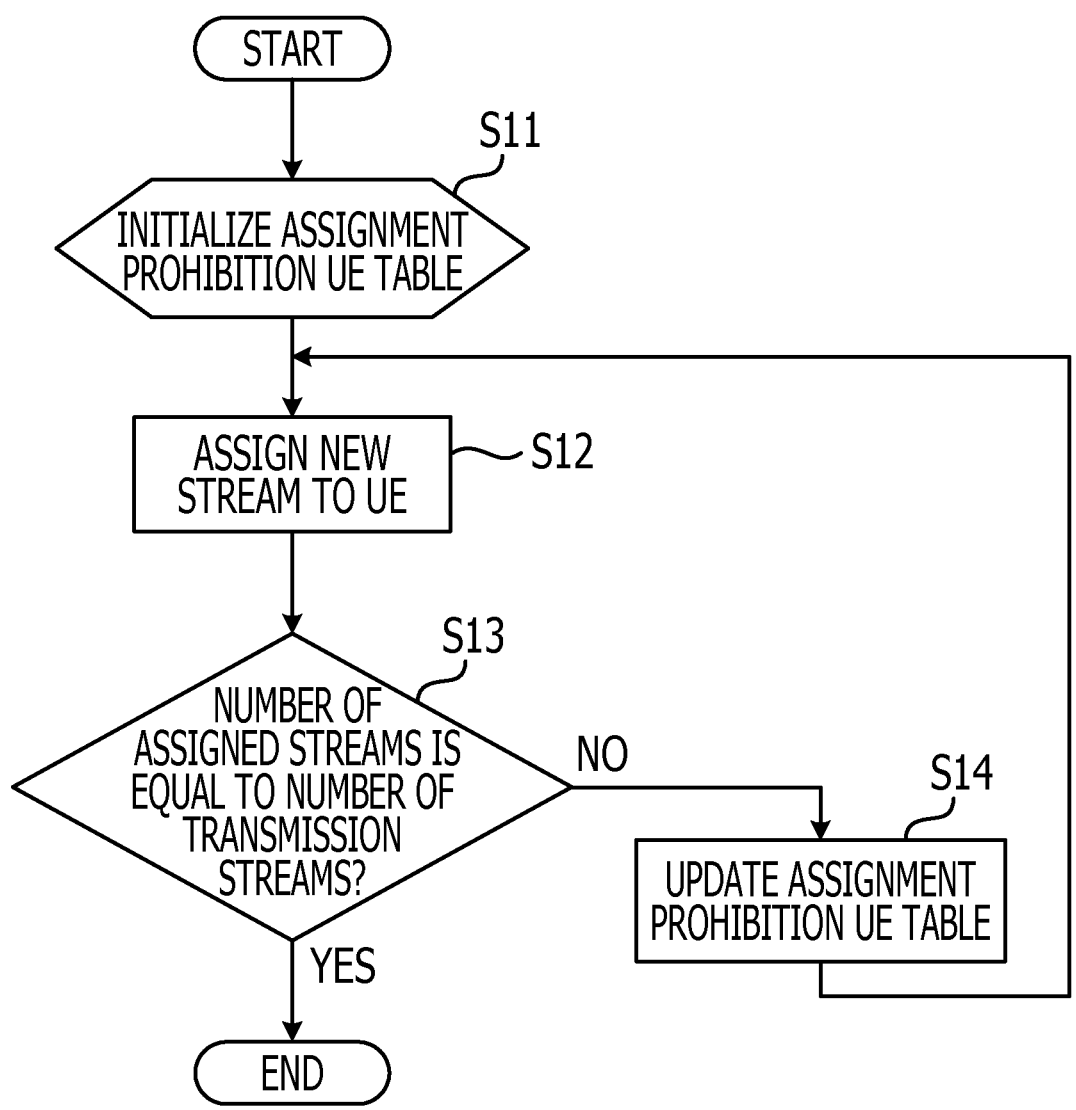
FIG. 13 is a flowchart of a wireless resource assignment method that is performed when multiple transmission streams are used.

FIG. 13 is a flowchart of the wireless resource assignment method when multiple transmission streams are used. First, the DL scheduler 22 initializes the wireless resource assignment table and an assignment prohibition user equipment table (operation S11). Then, the DL scheduler 22 selects one of the user equipment units that is not registered in the assignment prohibition user equipment table. The DL scheduler 22 assigns the selected user equipment to one of the new streams and registers the stream number of the assigned stream and the user equipment number of the selected user equipment in the wireless resource assignment table (operation S12). Next, the DL scheduler 22 determines whether or not the number of assigned streams is equal to the number of the transmission streams (operation S13). When the number of the assigned streams is equal to the number of the transmission streams ("Yes" in operation S13), the wireless resource assignment method illustrated in FIG. 13 is terminated. When the number of the assigned streams is different from the number of the transmission streams ("No" in operation S13), the DL scheduler 22 registers the user equipment assigned to the stream in the assignment prohibition user equipment table (operation S14) and the wireless resource assignment method proceeds to operation S12. The DL scheduler 22 performs the wireless resource assignment method for each of the wireless resources. In this case, one or more of the remote access units may transmits multiple streams. However, when all of the user equipment associated with remote access units that transmit the assigned streams are registered in the assignment prohibition user equipment table, interference between streams may be suppressed.

FIG. 14 is a diagram illustrating the wireless resource assignment table that is used when the multiple transmission streams are used. The wireless resource assignment table indicates the user equipment numbers of the user equipment assigned to the wireless resources and the user equipment numbers of the user equipment assigned to the streams.

In the wireless resource assignment method, when two different user equipment units are associated with two different remote access units, respectively, signals to be transmitted to the two user equipment units are assigned to streams, respectively, that are different from each other and transmitted with the same wireless resource.

The remote access units 3a, 3b, 3c, 3d, 3e and 3f perform the aforementioned remote access unit downlink process for each of the transmission streams.

When the number of transmission streams is two or more, the DL scheduler 22 generates the user equipment precoding vector table using a method that is the same as or similar to the wireless resource assignment method used when multiple streams are used. In this case, the user equipment precoding vector table indicates precoding vector numbers for each of the remote access unit numbers, precoding vector numbers for each of the stream numbers, and precoding vector numbers for each of the wireless resource numbers.

Figure 15:
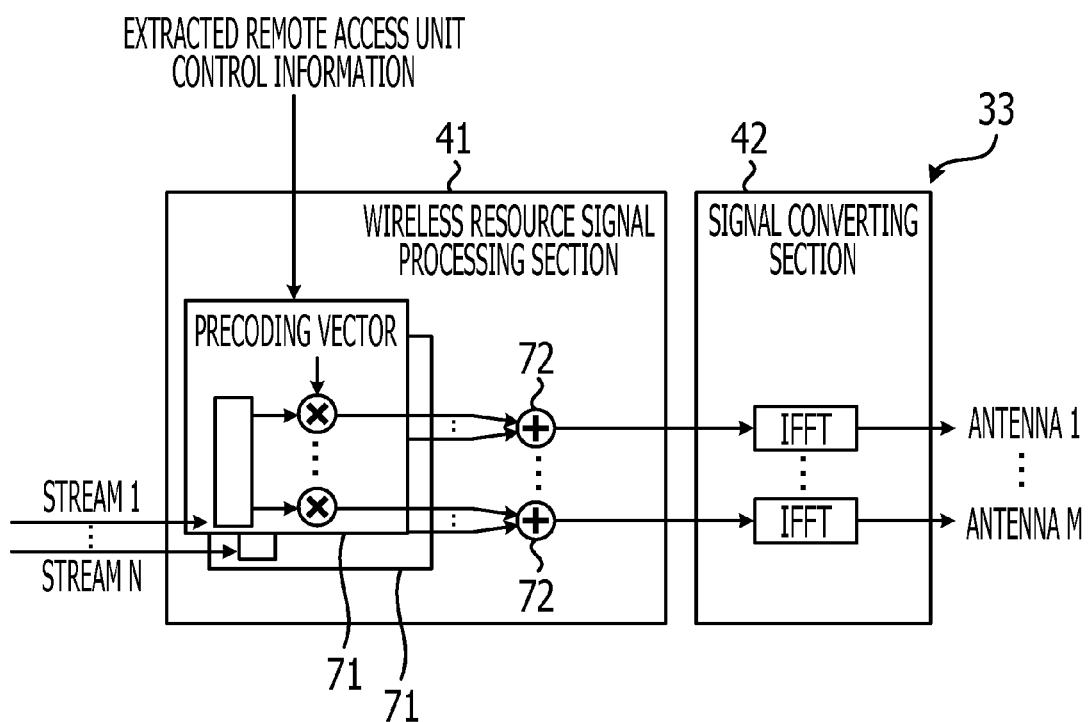
FIG. 15 is a block diagram illustrating the configuration of the DL signal processing section while the multiple transmission streams are used.

FIG. 15 is a block diagram illustrating the configuration of the DL signal processing section 33 while multiple transmission streams are used. FIG. 15 illustrates the case in which the number of the transmission streams is N and the number of transmission antennas is M. In this case, the DL signal processing section 33 includes the wireless resource signal processing section 41 and the signal converting section 42. The wireless resource signal processing section 41 includes a precoding vector multiplying section 71 and a summing section 72.

The n-th transmission stream is defined as a stream S_n (n is an integer of 0 to N−1). First, the precoding vector multiplying section 71 copies each of the transmission streams S_n (that are included in the base station downlink signal) so as to generate a number M of copied signals S_n_m (m is an integer of 0 to M−1) from each of the transmission streams S_n. Next, the precoding vector multiplying section 71 multiplies, for each of wireless resources indicated in the copied signals S_n_m, precoding vectors corresponding to a stream number and a wireless resource number that are indicated in the extracted remote access unit control information. Then, the precoding vector multiplying section 71 generates a number M of multiplication results R_n_m from the transmission stream S_n for each of the number n of transmission streams. Then, the summing section 72 sums the multiplication results R_n_m for each of the copied signals S_n_m by changing the number n from 0 to N−1 so as to generate a number M of summing results A-m.

Then, the signal converting section 42 performs IFFT on the summing results A-m so as to generate remote access unit downlink signals that are transmitted from the number M of antennas, respectively.

In the same manner as in the first embodiment, the remote access units may each extract, from the base station downlink signal, information on a wireless resource and information on a stream indicated by the extracted remote access unit control information to be necessary for transmission to be performed by the remote access unit. In addition, the remote access units may each extract, from the user equipment uplink signals, information on a wireless resource and information on a stream indicated by the extracted remote access unit control information to be necessary for reception to be performed by the remote access unit.

(Third Embodiment)

Next, remote access units 3p that are a modified example of the remote access unit 3a and are not coupled in cascade are described.

A distributed antenna system according to the third embodiment includes a plurality of the remote access units 3p instead of the remote access units 3a, 3b, 3c, 3d, 3e and 3f, compared with the distributed antenna system according to the first embodiment.

Figure 16:
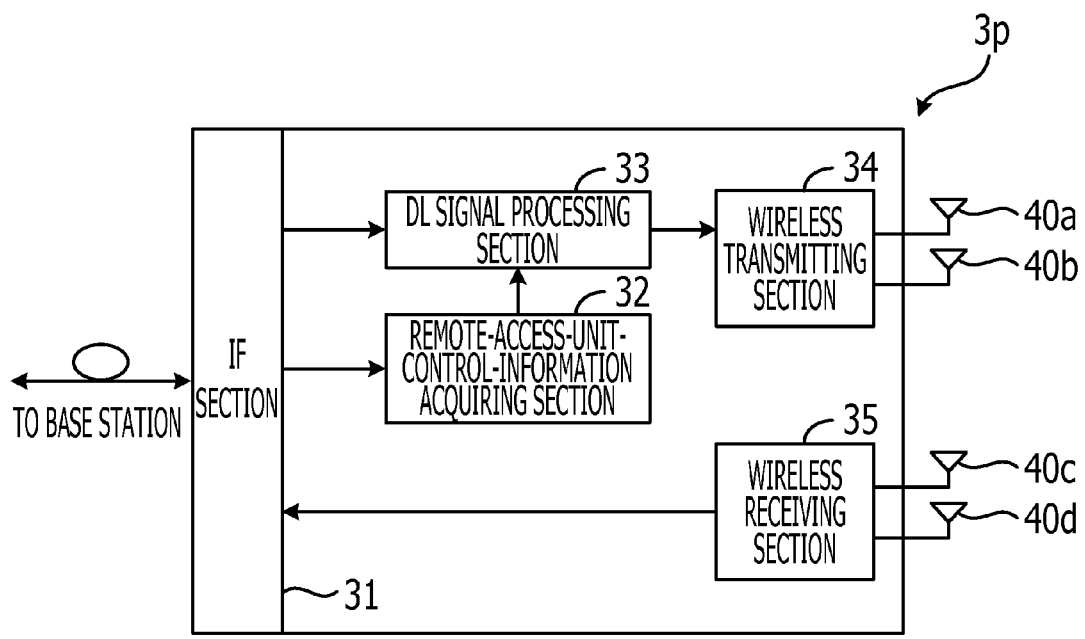
FIG. 16 is a block diagram illustrating the configuration of another remote access unit.

FIG. 16 is a block diagram illustrating the configuration of the remote access unit 3p. The remote access unit 3p includes an IF section 31, a remote-access-unit-control-information acquiring section 32, a DL signal processing section 33, a wireless transmitting section 34, a wireless receiving section 35 and antennas 40a, 40b, 40c and 40d. The elements that are included in the remote access unit 3p and indicated by the same reference numerals as the elements included in the remote access unit 3a are substantially the same as or correspond to the elements included in the remote access unit 3a. All the remote access units 3p are coupled to the base station 2a.

The IF section 31 communicates with the base station 2a through the BS-to-RAU interface. The IF section 31 receives the base station downlink signal and the remote access remote access unit control information from the base station 2a and outputs the base station downlink signal and the remote access unit control information to the DL signal processing section 33. In addition, the IF section 31 transmits, to the base station 2a, a user equipment uplink signal received by the wireless receiving section 35 as a remote access unit uplink signal.

(Fourth Embodiment)

In the following description, the remote access units each transmit, to the user equipment, an identification signal that indicates the remote access unit; a user equipment then identifies a remote access unit that is any of the remote access units and that provides a high communication quality; and the association process is performed.

A distributed antenna system according to the fourth embodiment includes a plurality of remote access units 3q instead of the remote access units 3a, 3b, 3c, 3d, 3e and 3f, compared with the distributed antenna system according to the first embodiment.

Figure 17:
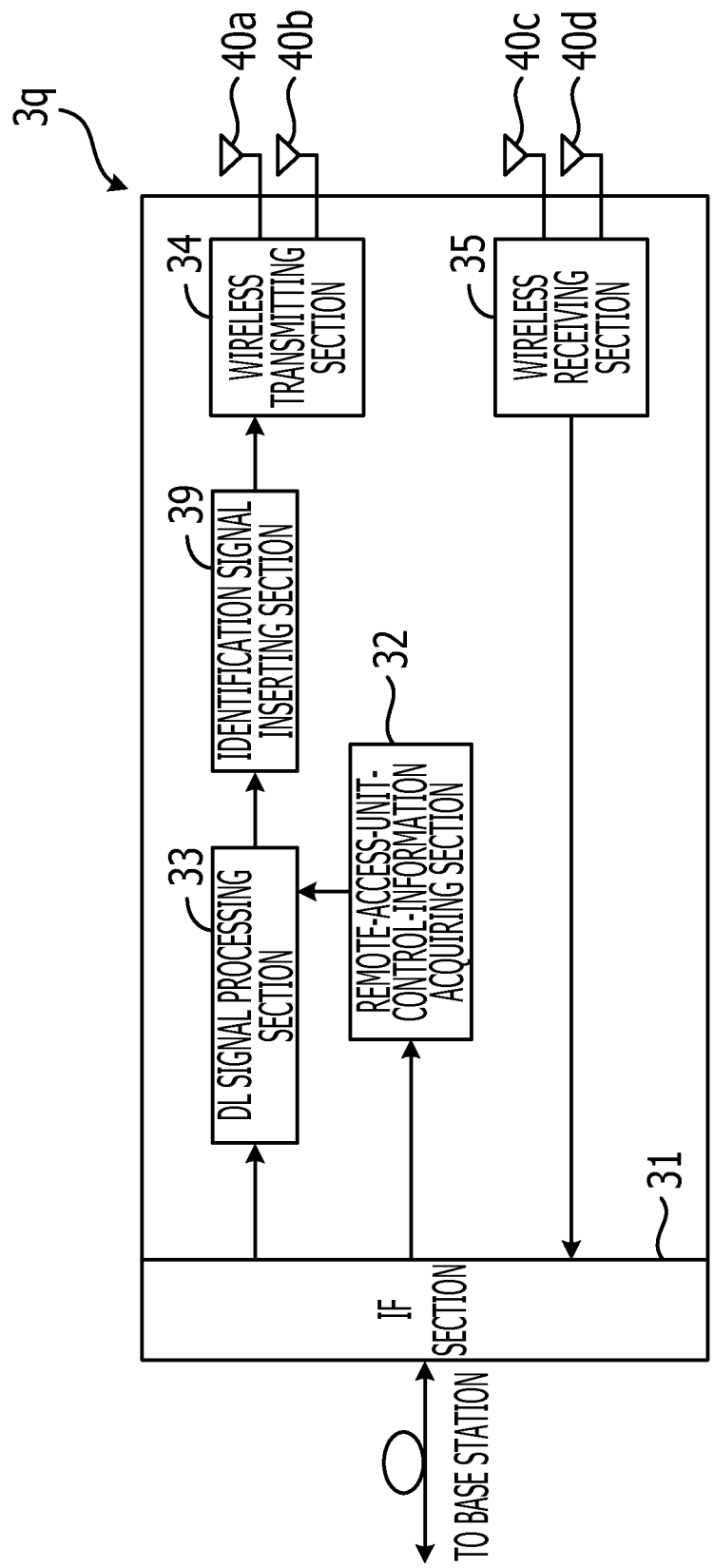
FIG. 17 is a block diagram illustrating the configuration of another remote access unit.

FIG. 17 is a block diagram illustrating the configuration of the remote access unit 3q. The remote access units 3q are not coupled in cascade, similarly to the remote access unit 3p. The elements that are included in the remote access unit 3q and indicated by the same reference numerals as the elements included in the remote access unit 3p are the same as or correspond to the elements included in the remote access unit 3p. Compared with the remote access units 3p, the remote access units 3q each further include an identification signal inserting section 39. All the remote access units 3q are coupled to the base station 2a.

Figure 18:
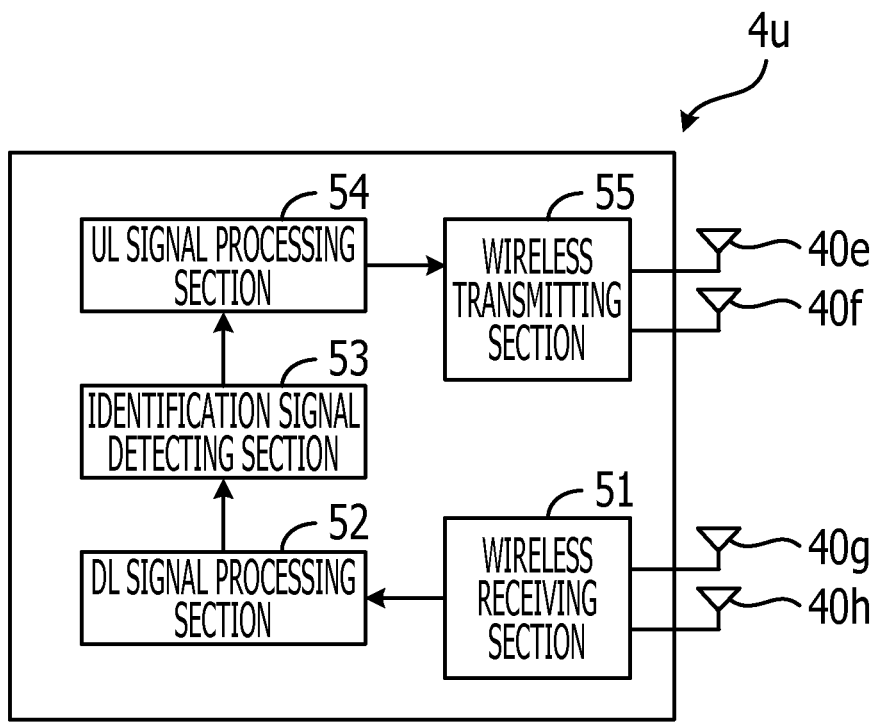
FIG. 18 is a block diagram illustrating the configuration of user equipment.

FIG. 18 is a block diagram illustrating the configuration of user equipment 4u. The user equipment 4u includes a wireless receiving section 51, a DL signal processing section 52, an identification signal detecting section 53, an UL signal processing section 54, a wireless transmitting section 55 and antennas 40e, 40f, 40g and 40h. The configuration of the user equipment 4v is the same as the configuration of the user equipment 4u.

Figure 19:
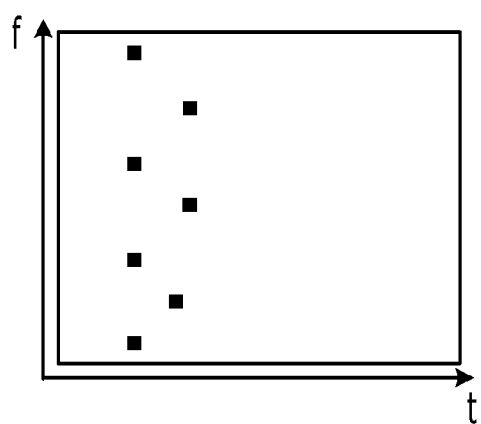
FIG. 19 is a schematic diagram illustrating puncture patterns.
Figure 19:
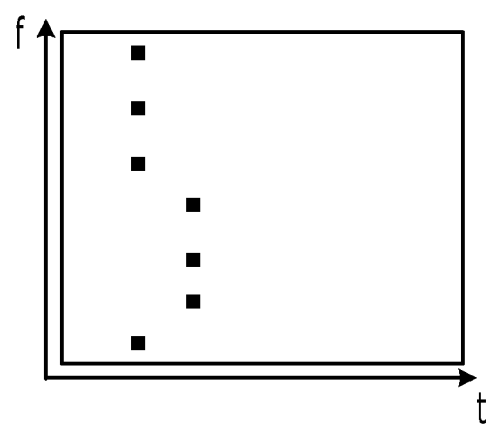

In the remote access unit 3q, the identification signal inserting section 39 inserts an identification signal in the remote access unit downlink signal and outputs, to the wireless transmitting section 34, the remote access unit downlink signal that includes the identification signal. The identification signal includes puncture patterns described below, for example. FIG. 19 is a schematic diagram illustrating the puncture patterns. In FIG. 19, the puncture patterns are indicated by P1 and P2. The puncture patterns P1 and P2 are each expressed on a frequency-time plane and defined as lines that indicate transmission power at each of locations and are indicated by 0 or 1. Specific locations that are defined by points in the frequency-time plane indicate locations at which transmission power that is indicated in the remote access unit downlink signal is 0. Puncture patterns that are different from each other and correspond to the remote access unit number of each of the remote access units are defined. The remote access units 3q each transmit puncture patterns that correspond to the remote access unit.

When the remote access unit 3q transmits one of the puncture patterns and the user equipment 4u receives the puncture pattern from the remote access unit 3q, reception power is 0 at the specific locations. The base station 2a, the remote access units 3q, the user equipment 4u and the like each have stored therein the puncture patterns that correspond to the remote access units 3q.

In the user equipment 4u, the wireless receiving section 51 receives a wireless signal from the remote access unit 3q and converts the received signal into a baseband signal. The DL signal processing section 52 receives the baseband signal from the wireless receiving section 51 and demodulates data that is included in the received baseband signal. The DL signal processing section 52 detects reception power for each of subcarriers, the average value of the reception power of all the subcarriers, and the like.

The identification signal detecting section 53 determines whether or not the reception power of each of the subcarriers satisfies a predetermined reception power requirement. The predetermined reception power requirement means that the reception power is less than a reception power threshold. The reception power threshold is a value obtained by subtracting a predetermined value from the average value of the reception power of all the subcarriers, for example. Next, the identification signal detecting section 53 identifies, on the frequency-time plane, puncture patterns that indicate the arrangements of subcarriers that satisfy the reception power requirement. Then, the identification signal detecting section 53 outputs, to the UL signal processing section 54, a reception remote access unit number that is a remote access unit number that corresponds to the identified puncture patterns.

The UL signal processing section 54 of the user equipment 4*u* generates a user equipment uplink signal that includes the user equipment number of the user equipment 4*u* and the reception remote access unit number.

The wireless transmitting section 55 modulates the user equipment uplink signal and wirelessly transmits the modulated user equipment uplink signal through the antennas 40*e* and 40*f*.

The remote access unit 3*q* receives the user equipment uplink signal and generates a remote access unit uplink signal based on the user equipment uplink signal. The remote access unit 3*q* transmits the generated remote access unit uplink signal to the base station 2*a*. The remote access unit uplink signal includes: the received user equipment uplink signal; a reception user equipment number that is the user equipment number of the user equipment that has transmitted the received user equipment uplink signal; and the reception remote access unit number identified by the unit of user equipment.

In the base station 2*a*, the UL signal processing section 26 acquires, from the received remote access unit uplink signal, a combination of the reception user equipment number and the reception remote access unit number, and the like. The UE managing section 21 generates the association table based on the combination of the acquired reception user equipment number and the acquired reception remote access unit number. For example, an associated remote access unit number is defined as a remote access unit number of a remote access unit that satisfies a predetermined communication quality requirement. The predetermined communication quality requirement means that puncture patterns have been identified by the user equipment. In this case, the UE managing section 21 sets, to the reception remote access unit number based on the combination of the acquired reception user equipment number and the acquired reception remote access unit number, the association remote access unit that corresponds to the reception user equipment number in the association table.

The association process is performed at predetermined intervals. When the association process is performed, the association table is updated.

(Fifth Embodiment)

In the following description, the association process is performed using a delay profile that is inserted in the user equipment uplink signal.

Compared with the distributed antenna system according to the first embodiment, a distributed antenna system according to the fifth embodiment includes a base station 2*g* instead of the base station 2*a* and includes a plurality of remote access units 3*g* instead of the remote access units 3*a*, 3*b*, 3*c*, 3*d*, 3*e* and 3*f*.

The remote access units 3*g* are described below.

Figure 20:
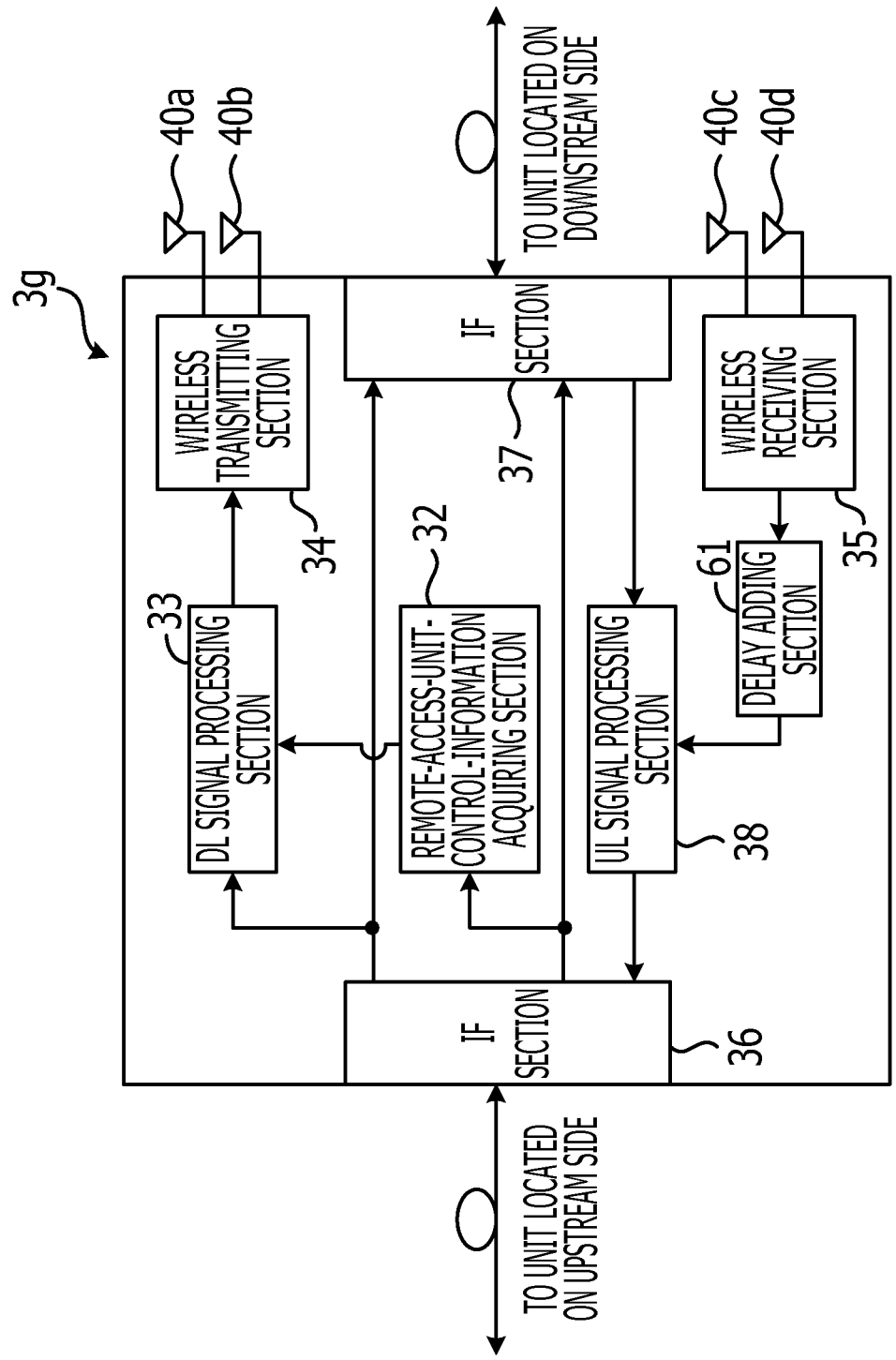
FIG. 20 is a block diagram illustrating the configuration of another remote access unit.

FIG. 20 is a block diagram illustrating the configuration of the remote access unit 3*g*. The remote access units 3*g* may be coupled in cascade in a similar manner to the remote access unit 3*a*. The elements that are included in the remote access unit 3*g* and indicated by the same reference numerals as the elements included in the remote access unit 3*a* are substantially the same as or correspond to the elements included in the remote access unit 3*a*. Compared with the remote access unit 3*a*, the remote access units 3*g* each further include a delay adding section 61.

Remote access unit delay times are delay times that are different from each other and set in the delay adding sections 61 of the remote access units 3*g*, respectively. The delay adding section 61 of each of the remote access units 3*g* adds the remote access unit delay time set in the remote access unit 3*g* to the user equipment uplink signal received by the wireless receiving section 35, and then outputs, to the UL signal processing section 38, the user equipment uplink signal.

The UL signal processing section 38 combines the signal output from the delay adding section 61 with the remote access unit uplink signal received from another remote access unit among the remote access units 3*g*.

Next, the base station 2*g* is described.

Figure 21:
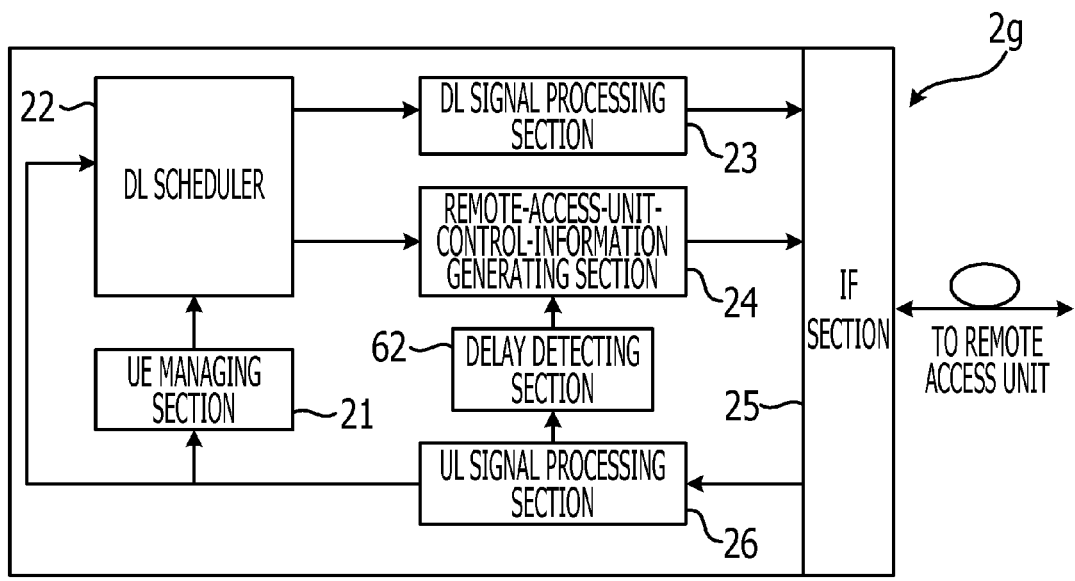
FIG. 21 is a block diagram illustrating the configuration of another base station.

FIG. 21 is a block diagram illustrating the configuration of the base station 2*g*. The elements that are included in the base station 2*g* and indicated by the same reference numerals as the elements included in the base station 2*a* are substantially the same as or correspond to the elements included in the base station 2*a*. Compared with the base station 2*a*, the base station 2*g* further includes a delay detecting section 62.

The delay detecting section 62 calculates a delay profile that is included in the received remote access unit uplink signal. As described above, the received remote access unit uplink signal is a signal obtained by adding the delay times that are different from each other to the signals received by the multiple remote access units and combining the signals. Thus, the delay profile indicates reception power (of the remote access units) that corresponds to the delay times of the remote access units. Next, the delay detecting section 62 compares the reception power that corresponds to the remote access unit delay times of the remote access units and indicated in the delay profile. Then, the delay detecting section 62 determines the order of the reception power of the remote access units.

The UE managing section 21 of the base station 2*g* acquires, from the results of the demodulation performed by the UL signal processing section 26, information on the user equipment unit that has transmitted the user equipment uplink signal that is included in the received remote access unit uplink signal. Then, the UE managing section 21 of the base station 2*g* sets the user equipment unit indicated by the acquired information as the transmitting user equipment. Next, the UE managing section 21 registers the order (determined by the delay detecting section 62) of the reception power of the remote access units in the association table as a priority order of associated remote access unit numbers of remote access units associated with the transmitting user equipment.

The aforementioned association process is performed at predetermined intervals. When the association process is performed, the association table is updated.

In each of the aforementioned embodiments, the base station may transmit the same downlink signal to all the remote access units, and all types of topologies may be applied to the connection of the base station to the remote access units. In each of the aforementioned embodiments, the base station does not need to select a remote access unit, and baseband signal processing may be easily performed.

The wireless communication system includes, for example, any of the base stations 2a and 2g and at least two of the remote access units 3a, 3b, 3c, 3d, 3e, 3f, 3g, 3p and 3q.

The base station device and a base station section each include, for example, any of the base stations 2a and 2g.

The remote access device and a remote access section each include, for example, any of the remote access units 3a, 3b, 3c, 3d, 3e, 3f, 3g, 3p and 3q.

Terminal equipment includes, for example, any of the user equipment 4u and 4v.

A determining section includes, for example, the UE managing section 21, the DL scheduler 22 and the remote-access-unit-control-information generating section 24.

A first receiving section includes, for example, the UL signal processing section 26 and the IF section 25.

A first transmitting section includes, for example, the DL signal processing section 23 and the IF section 25.

A second receiving section includes, for example, the IF section 36 or 31 and the remote-access-unit-control-information acquiring section 32.

A second transmitting section includes, for example, the IF section 36.

A third receiving section includes, for example, the wireless receiving section 35 and the IF section 37.

A third transmitting section includes, for example, the wireless transmitting section 34.

A fourth receiving section includes, for example, the IF section 37.

A fourth transmitting section includes, for example, the IF section 37.

A first signal processing section includes, for example, the DL signal processing section 33.

A second signal processing section includes, for example, the UL signal processing section 38.

A first association information includes, for example, the association table.

A second association information and a third association information each include, for example, the wireless resource assignment table.

A first downlink signal includes, for example, the base station downlink signal.

A second downlink signal includes, for example, the remote access unit downlink signal.

A first uplink signal includes, for example, the remote access unit uplink signal.

A second uplink signal includes, for example, the user equipment uplink signal.

Data patterns include, for example, the puncture patterns.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiments of the present inventions have been described in detail, it should be understood that the various changes, substitutions, and alterations could be made hereto without departing from the spirit and scope of the invention.

What is claimed is:

1. A wireless communication system comprising:
   a base station comprising:
      a determining section that determines control information indicating signal processing for each of a plurality of wireless resources used for wireless communication with a plurality of terminal equipment units; and
   a plurality of remote access sections, each remote access section of the plurality of remote access sections comprising:
      a first signal processing section that performs first signal processing on a first downlink signal received from the base station so as to generate a second downlink signal to be transmitted to the plurality of terminal equipment units via the wireless communication; and
      a second signal processing section that performs second signal processing on a second uplink signal received from the plurality of terminal equipment units via the wireless communication so as to generate a first uplink signal to be transmitted to the base station, and
   wherein at least one of the first signal processing and the second signal processing being performed for each of the wireless resources based on the control information,
   wherein the control information indicates whether or not the wireless resources are necessary for each of the remote access sections of the plurality of remote access sections,
   wherein the first signal processing section of each of the remote access sections of the plurality of remote access sections inserts, in the second downlink signal, information on a wireless resource indicated by the control information to be necessary for the remote access section, and does not insert, in the second downlink signal, information on a wireless resource indicated by the control information to be unnecessary for the remote access section, the information that is inserted in the second downlink signal and the information that is not inserted in the second downlink signal being included in the first downlink signal, and
   wherein the determining section determines the control information by storing first association information that indicates associations of the units of terminal equipment with the remote access sections of the plurality of remote access sections that are senders of the second downlink signals to be transmitted to the units of terminal equipment, storing second association information that indicates associations of the wireless resources with the units of terminal equipment that are destinations of the second downlink signals and use the wireless resources, and determining, based on the first association information and the second association information, whether or not the wireless resources are necessary for each of the remote access sections of the plurality of remote access sections.

2. The wireless communication system according to claim 1,
   wherein when a first remote access section is one of the remote access sections of the plurality of remote access sections, a first unit of terminal equipment is associated with the first remote access section based on the first association information, a first wireless resource is associated with the first unit of terminal equipment based on the second association information, a second unit of terminal equipment is not associated with the first remote access section based on the first association information, and a second wireless resource is associated with the second unit of terminal equipment on the second association information, the determining section determines the control information that indicates the first wireless resource is necessary for the first remote access section and the second wireless resource is not necessary for the first remote access section.

3. The wireless communication system according to claim 1,
wherein the determining section determines the first association information by extracting or identifying, from the first uplink signal, signal power of the signal received by the remote access sections of the plurality of remote access sections from any of the units of terminal equipment.

4. The wireless communication system according to claim 1,
wherein each first signal processing section of the plurality of remote access sections performs precoding for each of the wireless resources in order to perform MIMO transmission.

5. The wireless communication system according to claim 1,
wherein the control information indicates the first signal processing that is performed by each remote access section of the plurality of remote access sections on each of streams for each of the wireless resources, and
wherein each first signal processing section of the plurality of remote access sections generates the second downlink signal by performing the first signal processing on each of the streams included in the first downlink signal for each of the wireless resources based on the control information.

6. The wireless communication system according to claim 1
wherein a plurality of data patterns that are associated with each of the remote access sections of the plurality of remote access sections and different from each other are prestored in the remote access sections of the plurality of remote access sections and the units of terminal equipment,
wherein the first signal processing section of each of the remote access sections of the plurality of remote access sections generates the second downlink signal by converting the first downlink signal based on specific data patterns that are included in the plurality of data patterns and associated with the remote access section of the plurality of remote access sections,
wherein the units of terminal equipment each receives the second downlink signal, identifies the specific data patterns based on the received second downlink signal, identifies, based on the identified specific data patterns, the remote access section of the plurality of remote access sections that has transmitted the specific data patterns, and inserts, in the second uplink signal, information on the remote access section of the plurality of remote access sections that has transmitted the specific data pattern, and
wherein the determining section identifies from the first uplink signal the remote access section of the plurality of remote access sections that has transmitted the specific data patterns and the unit of terminal equipment that has received the specific data patterns, and determines the first association information so that the identified unit of terminal equipment is associated with the identified remote access section.

7. A wireless communication system comprising:
a base station comprising:
a determining section that determines control information indicating signal processing for each of a plurality of wireless resources used for wireless communication with a plurality of terminal equipment units; and
a plurality of remote access sections, each remote access section of the plurality of remote access sections comprising:
a first signal processing section that performs first signal processing on a first downlink signal received from the base station so as to generate a second downlink signal to be transmitted to the plurality of terminal equipment units via the wireless communication; and
a second signal processing section that performs second signal processing on a second uplink signal received from the plurality of terminal equipment units via the wireless communication so as to generate a first uplink signal to be transmitted to the base station, and
wherein at least one of the first signal processing and the second signal processing being performed for each of the wireless resources based on the control information,
wherein the control information indicates the first signal processing that is performed by each remote access section of the plurality of remote access sections on each of streams for each of the wireless resources,
wherein the first signal processing sections each generate the second downlink signal by performing the first signal processing on each of the streams included in the first downlink signal for each of the wireless resources based on the control information,
wherein the determining section determines the control information by storing first association information that indicates associations of the units of terminal equipment with the remote access sections of the plurality of remote access sections that are senders of the second downlink signals to be transmitted to the units of terminal equipment, storing third association information that indicates associations among the wireless resources, the streams and the units of terminal equipment that are destinations of the second downlink signals and use the streams and the wireless resources, and determining, based on the first association information and the third association information, whether or not the wireless resources are necessary for each of the remote access sections of the plurality of remote access sections,
wherein when a third remote access section is one of the remote access sections of the plurality of remote access sections, a fourth remote access section is another one of the remote access sections of the plurality of remote access sections, a third unit of terminal equipment is associated with the third remote access section based on the first association information, and a fourth unit of terminal equipment is associated with the fourth remote access section based on the first association information, a third wireless resource that is one of the wireless resources is associated with a first stream and a second stream based on the third association information, the first stream being one of the streams and associated with the third unit of terminal equipment, the second stream being another one of the streams and associated with the fourth unit of terminal equipment, and
wherein the determining section inserts a signal to be transmitted to the third unit of terminal equipment in the first stream of the first downlink signal and inserts a signal to be transmitted to the fourth unit of terminal equipment in the second stream of the first downlink signal.

8. The wireless communication system according to claim 7,
wherein delay times that are associated with the remote access sections of the plurality of remote access sections, respectively, and different from each other are prestored in the remote access sections of the plurality of remote access sections and the base station,
wherein the second signal processing sections each generate the second uplink signal by adding the delay time to the second uplink signals, and
wherein the determining section identifies the terminal equipment unit that is a sender of the second uplink signal included in the first uplink signal, detects the delay time indicated in the first uplink signal, identifies the remote access section of the plurality of remote access sections that has added the detected delay time to the second uplink signals, and determines the first association information so that the identified terminal equipment unit is associated with the identified remote access section.

9. A wireless communication method comprising:
determining at a base station control information indicating signal processing for each of a plurality of wireless resources used for wireless communication with a plurality of terminal equipment units, the control information indicates whether or not the wireless resources of the plurality are necessary for each remote access section of a plurality of remote access sections;
performing, at a remote access section of the plurality of remote access sections, first signal processing on a first downlink signal received from the base station so as to generate a second downlink signal to be transmitted to the plurality of terminal equipment units via the wireless communication;
performing, at the remote access section of the plurality of remote access sections, a second signal processing on a second uplink signal received from the plurality of terminal equipment units via the wireless communication so as to generate a first uplink signal to be transmitted to the base station; and
inserting, in the second downlink signal, information on a wireless resource indicated by the control information to be necessary for the remote access section of the plurality of remote access sections, and does not insert, in the second downlink signal, information on a wireless resource indicated by the control information to be unnecessary for the remote access section of the plurality of remote access sections, the information that is inserted in the second downlink signal and the information that is not inserted in the second downlink signal being included in the first downlink signal, wherein
the determining the control information comprises storing first association information that indicates associations of the units of terminal equipment with the remote access sections of the plurality of remote access sections that are senders of the second downlink signals to be transmitted to the units of terminal equipment, storing second association information that indicates associations of the wireless resources with the units of terminal equipment that are destinations of the second downlink signals and use the wireless resources, and determining, based on the first association information and the second association information, whether or not the wireless resources are necessary for each of the remote access sections of the plurality of remote access sections,
wherein at least one of the first signal processing and the second signal processing being performed for each of the wireless resources based on the control information.

10. A base station comprising:
a determining section that determines control information indicating signal processing for each of a plurality of wireless resources used for wireless communication with a plurality of terminal equipment units, the control information indicates whether or not the wireless resources of the plurality are necessary for each remote access section of a plurality of remote access sections;
a transmitter to transmit a first downlink signal to a remote access section of a plurality of remote access sections, the remote access section performs first signal processing on the first downlink signal so as to generate a second downlink signal to be transmitted to the plurality of terminal equipment units via the wireless communication; and
a receiver to receive a first uplink signal transmitted from the remote access section of a plurality of remote access sections, the remote access section performs second signal processing on a second uplink signal received from the plurality of terminal equipment units via the wireless communication so as to generate the first uplink signal,
wherein at least one of the first signal processing and the second signal processing being performed for each of the wireless resources based on the control information,
wherein the remote access section of the plurality of remote access sections inserts, in the second downlink signal, information on a wireless resource indicated by the control information to be necessary for the remote access section, and does not insert, in the second downlink signal, information on a wireless resource indicated by the control information to be unnecessary for the remote access section, the information that is inserted in the second downlink signal and the information that is not inserted in the second downlink signal being included in the first downlink signal, and
wherein the determining section determines the control information by storing first association information that indicates associations of the units of terminal equipment with the remote access sections of the plurality of remote access sections that are senders of the second downlink signals to be transmitted to the units of terminal equipment, storing second association information that indicates associations of the wireless resources with the units of terminal equipment that are destinations of the second downlink signals and use the wireless resources, and determining, based on the first association information and the second association information, whether or not the wireless resources are necessary for each of the remote access sections of the plurality of remote access sections.

11. A remote access device comprising:
a first signal processing section that performs first signal processing on a first downlink signal received from a base station so as to generate a second downlink signal to be transmitted to a plurality of terminal equipment units via wireless communication; and
a second signal processing section that performs second signal processing on a second uplink signal received from the plurality of terminal equipment units via the wireless communication so as to generate a first uplink signal to be transmitted to the base station,
wherein the first signal processing section inserts, in the second downlink signal, information on a wireless resource indicated by control information to be necessary for the remote access device, and does not insert, in the second downlink signal, information on a wireless resource indicated by the control information to be unnecessary for the remote access device, the information that is inserted in the second downlink signal and the information that is not inserted in the second downlink signal being included in the first downlink signal, wherein the control information is determined by the base station and indicates signal processing for each of a plurality of wireless resources used for wireless communication with a plurality of terminal equipment units and the control information indicates whether or not the wireless resources are necessary for the remote access device, wherein at least one of the first signal processing and the second signal processing being performed for each of the wireless resources based on the control information, and wherein the base station determines the control information by storing first association information that indicates associations of the units of terminal equipment with remote access devices of a plurality of remote access devices that are senders of the second downlink signals to be transmitted to the units of terminal equipment, storing second association information that indicates associations of the wireless resources with the units of terminal equipment that are destinations of the second downlink signals and use the wireless resources, and determining, based on the first association information and the second association information, whether or not the wireless resources are necessary for each of the remote access devices of the plurality of remote access devices.

* * * * *